US012018864B2

(12) United States Patent
Petersen

(10) Patent No.: US 12,018,864 B2
(45) Date of Patent: Jun. 25, 2024

(54) SORPTION SYSTEM AND METHOD FOR OPERATING SAME

(71) Applicant: TECHNISCHE UNIVERSITÄT BERLIN, Berlin (DE)

(72) Inventor: Stefan Petersen, Berlin (DE)

(73) Assignee: TECHNISCHE UNIVERSITÄT BERLIN, Berlin (DE)

(*) Notice: Subject to any disclaimer, the term of this patent is extended or adjusted under 35 U.S.C. 154(b) by 0 days.

(21) Appl. No.: 17/783,051

(22) PCT Filed: Dec. 3, 2020

(86) PCT No.: PCT/EP2020/084381
§ 371 (c)(1),
(2) Date: Jun. 7, 2022

(87) PCT Pub. No.: WO2021/130003
PCT Pub. Date: Jul. 1, 2021

(65) Prior Publication Data
US 2023/0041044 A1    Feb. 9, 2023

(30) Foreign Application Priority Data

Dec. 23, 2019  (EP) .................................... 19219205

(51) Int. Cl.
*F25B 15/00*    (2006.01)
*F25B 15/04*    (2006.01)
*F25B 15/06*    (2006.01)

(52) U.S. Cl.
CPC .............. *F25B 15/06* (2013.01); *F25B 15/04* (2013.01); *F25B 2315/002* (2013.01); *F25B 2500/26* (2013.01); *F25B 2600/2501* (2013.01)

(58) Field of Classification Search
CPC .. F25B 15/06; F25B 15/04; F25B 2600/2501; F25B 2400/0403; F25B 2315/002
See application file for complete search history.

(56) References Cited

U.S. PATENT DOCUMENTS

2019/0128582 A1* 5/2019 Garrabrant ............ F25B 49/043

FOREIGN PATENT DOCUMENTS

EP       0152931 A2    8/1985
JP       S5339360 U    4/1978

OTHER PUBLICATIONS

International Search Report (English and German) and Written Opinion (German) of the International Search Authority issued in PCT/EP2020/084381, mailed on Feb. 18, 2021; ISA/EP.
(Continued)

*Primary Examiner* — Brian M King
(74) *Attorney, Agent, or Firm* — Harness, Dickey & Pierce, P.L.C.

(57) ABSTRACT

The invention relates to a method for operating a sorption system (1), the sorption system comprising the following: a cooling fluid circuit (8), which has a cooling fluid; a process medium circuit (6), which has a refrigerant and a solvent; an absorber (3), which is connected to the cooling fluid circuit (8) and to the process medium circuit (6); a condenser (5), which is connected to the cooling fluid circuit (8) and to the process medium circuit (6); and a control device. During operation of the sorption system (1), the cooling fluid is fed to the absorber (3) and to the condenser (5), and a feed of the cooling fluid to the absorber (3) and a feed of the cooling fluid to the condenser (5) are controlled differently from each other by means of the control device. The invention further relates to an arrangement for a sorption system (1) and to a sorpotion system (1).

13 Claims, 6 Drawing Sheets

(56) References Cited

OTHER PUBLICATIONS

Extended European Search Report issued in EP 19219205.2, mailed on Apr. 29, 2020.

* cited by examiner

SORPTION SYSTEM AND METHOD FOR OPERATING SAME

CROSS-REFERENCE TO RELATED APPLICATIONS

This application is a 371 U.S. National Phase of International Application No. PCT/EP2020/084381, filed on Dec. 3, 2020, which claims priority to European Patent Application No. 19219205.2 filed on Dec. 23, 2019. The entire disclosure of the above applications are incorporated herein by reference.

BACKGROUND

The demand for cooling energy and thus the total energy demand is constantly on the rise due to increased workplace requirements and comfort needs, due to the necessary cooling of food, but also for cooling and temperature control of temperature-sensitive production processes. Annual growth rates of 8% to 12% are currently being recorded in the field of building technology. This makes refrigeration one of the fastest growing energy consumers in the building sector worldwide.

The usually fluctuating loads in building cooling with the supplied quantities of energy becoming increasingly flexible in the provider structures require new storage concepts to selectively store this energy either on the side of the primary energy carrier (electricity, heat) or on the side of the energy user (movement, heat, cold). Heat and cold storage essentially differ in the temperature level of the energy to be stored.

Storage technologies for heat or cold storage can generally be divided into three groups: Sensible storage, latent storage, and thermochemical storage. Sensible storage tanks are available with liquid or solid storage medium and use the range between two temperature levels to store energy. The best-known representatives are the hot and cold water storage tanks. In the case of latent storage tanks, the latent heat during phase transitions (solid-liquid or liquid-gaseous) is used to store energy. In particular, latent storage tanks using a phase-changing material (PCM) for storage with higher energy densities are present in the market. In the field of latent storage, the most well-known and environmentally safe PCM is ice water or so-called ice slurry. Paraffins and similar substances are also used to enable phase change at the targeted temperature level. Finally, thermochemical storage tanks can be divided into chemical storage tanks and sorption storage tanks, and the latter into absorption storage tanks and adsorption storage tanks.

In refrigeration technology, storage presents a particular challenge. Sensible water storage tanks are typically used for useful temperatures, which are often around 5° C. to 9° C. in building technology. Unlike in heating technology, where a temperature range of 30 K to 50 K between a charged and discharged storage tank can often be used, this range is only a few Kelvin for a cold water storage tank with useful temperatures of 5° C. to 9° C., since the storage tank must have an average temperature level lower than the useful temperature. This reduces the thermal storage content to approx. 5% to 15% compared to a hot water storage tank.

Alternatively, ice storage tanks can be used. They still function even when useful temperatures around freezing point have to be provided and they have a substantially higher energy storage density. To prevent the storage medium from freezing, a cold brine must be used instead of cold water and therefore, if necessary, a system separation from the building must be made for air-conditioning applications. Ice storage tanks are particularly suitable for useful temperatures around 0° C. This also applies to useful temperatures above 4° C. to 5° C. if high energy densities are intended. If cost efficiency is the priority, however, sensible storage systems are preferred. The storage density of an ice storage tank, at approx. 200 kJ/kg, is about ten times greater than that of a sensible water storage tank for storing cold water. However, at higher useful temperature levels, the efficiency in refrigeration for loading an ice storage tank decreases compared to sensible storage. There are also PCM storage tanks for other phase change temperatures (e.g., 10° C.), but such storage tanks have not yet gained acceptance due to previous costs, technical feasibility, and lower energy densities compared to ice storage tanks.

Thus, there is a need for further cold storage technology. Such technologies are also of interest in connection with refrigeration, such as absorption refrigeration systems.

In known absorption refrigeration systems, the absorber and condenser are connected to the same heat sink circuit/cooling fluid circuit for the removal of heat. In this case, cooling fluid from the cooling fluid circuit often flows first through the absorber and then through the condenser. In individual systems, the flow may also pass first through the condenser and then through the absorber, or through both in parallel. In any case, however, known absorption refrigeration systems are operated in such a manner that the flow regime is already specified by the manufacturer of the absorption refrigeration systems and a varying supply of cooling fluid during operation is not possible separately for either the absorber or the condenser.

To compensate for differences between generator capacity and consumer load and to cover loads that cannot be covered by the generators, storage tanks (usually sensible storage tanks) are also installed in absorption refrigeration supply systems. These storage tanks are charged by the generators when the load of the consumer is low and discharged when the load of the consumers is higher than the generating capacities.

Document EP 0 152 931 A2 discloses a method for operating a monovalent generator-absorption heat pump heating system for space heating and water heating. In order to provide a multistage periodic absorption heat pump with a small number of apparatuses while avoiding susceptible, high-maintenance and energy-consuming components, a periodic alternation of an operating phase expulsion with condensation and evaporation with absorption at different pressure levels is provided.

Document JP S 5 339 360 U relates to a double-acting absorption refrigerator that uses water as a refrigerant and a salt solution as an absorbent, so that the start-up time required for operation and start-up can be shortened, in particular by improving the start-up characteristics.

In document US 2019/128 582 A1, a method of operating an absorption heat pump system is disclosed, in particular with respect to a flow of hydronic refrigerant fluid through a condenser during system startup or to a low refrigerant fluid temperature. In order to minimize a time required for an absorption heat pump to reach a maximum cooling or heating capacity, it is desirable for a pressure on the high pressure side to rise as quickly as possible and for another pressure on the low pressure side to drop as quickly as possible.

SUMMARY

It is an object of the invention to provide a method for operating a sorption system and an arrangement for a sorption system with which, in addition, heat and/or cold storage is achieved in a compact and cost-effective manner.

In order to solve this object, a method for operating a sorption system, an arrangement for a sorption system and a sorption system according to independent claims 1, 14 and 15 are provided. Further configurations are the subject matter of dependent subclaims.

According to one aspect, a method of operating a sorption system is provided. The sorption system comprises a cooling fluid circuit including a cooling fluid; a process medium circuit including a refrigerant and a solvent; an absorber which is connected to the cooling fluid circuit and the process medium circuit; a condenser which is connected to the cooling fluid circuit and the process medium circuit; and a control device. During operation of the sorption system, the cooling fluid is supplied to the absorber and the condenser, and by means of the control device, a supply of the cooling fluid to the absorber and a supply of the cooling fluid to the condenser are controlled differently from each other.

According to another aspect, an arrangement is provided, comprising the following: a cooling fluid circuit including a cooling fluid; a process medium circuit including a refrigerant and a solvent; an absorber which is connected to the cooling fluid circuit and the process medium circuit; a condenser which is connected to the cooling fluid circuit and the process medium circuit; and a control device which is configured to, during operation of the sorption system, control a supply of the cooling fluid to the absorber and a supply of the cooling fluid to the condenser differently from each other.

According to another aspect, a sorption system including the arrangement is provided.

By controlling the supply of cooling fluid to the absorber and the supply of cooling fluid to the condenser differently, a complete and/or at least partial decoupling of the cooling fluid flows to the absorber and to the condenser is achieved. In particular, it can be provided that by means of the control device, the supply of cooling fluid to the absorber and the supply of cooling fluid to the condenser are controlled independently of each other.

In the cooling fluid circuit, the control device can be arranged parallel to a bypass portion. The ratio of the supply of cooling fluid to the heat sink and the supply of cooling fluid to the bypass portion can be controlled by means of a flow-regulating component, preferably a valve.

In principle, the method is suitable for all continuously operating sorption systems for heat and/or cold generation which make use of a thermal compressor and use a sorbent and an absorbed substance (or solvent and refrigerant) as operating media.

The method makes it possible to eliminate the division between the cold generator and the cold storage tank (or the heat generator and the heat storage tank) and to combine these technical areas and their system technologies. The function assumed by common cold storage tanks in low-temperature heating circuits can be fully or partially covered by the independent control of the cooling fluid circuit. The method thus allows the additional use of the absorption refrigeration system as a power-dense storage tank. Consequently, where applicable, the installation of a separate dedicated cold storage tank can be omitted. Similarly, a possible hot water storage tank could be partially or completely replaced. Moreover, installation space is saved, which is often very limited in energy centers. The factor in the difference in volumetric power density is about 100. The gravimetric power density, compared with a reference storage tank of about 1 m$^3$ water volume, is even a factor of about 200, since a large amount of storage material becomes unnecessary here. For larger storage tanks, this factor decreases successively, but in general it will not be less than 150. It is also important that sorption systems such as absorption refrigeration systems in existing buildings can be retrofitted for this method with little effort.

The process is independent of the capacity range or the design of the sorption system. The method can be operated with any common solvent and/or refrigerant. Lithium bromide can be used as a solvent and water as a refrigerant. Alternatively, the method can be used in ammonia-water systems, for example.

The method can be operated at different temperature levels of connected heat sources and heat sinks. The temperature level of the low-temperature heat source can be between −40° C. and 20° C., in particular for building cooling between 5° C. and 16° C., or for food and drug cooling between −10° C. and 5° C. The temperature level of the heat sink can be between −15° C. and 80° C., in particular between 25° C. and 60° C., preferably 30° C. In principle, however, the heat sink can also be at other temperatures. The temperature level of the high-temperature heat source can be between 35° C. and 160° C., in particular between 55° C. and 110° C., preferably 90° C. Higher temperatures of the high-temperature source are also possible.

A method for operating a sorption system can be provided. The sorption system can comprise a cooling fluid circuit including a cooling fluid; a process medium circuit including a refrigerant and a solvent; an absorber which is connected to the cooling fluid circuit and the process medium circuit; a condenser which is connected to the cooling fluid circuit and the process medium circuit; and a control device. During operation of the sorption system, the cooling fluid can be supplied to the absorber and the condenser, and by means of the control device, a supply of the cooling fluid to the absorber and a supply of the cooling fluid to the condenser are individually controlled.

According to one aspect, an arrangement can be provided, comprising the following: a cooling fluid circuit including a cooling fluid; a process medium circuit including a refrigerant and a solvent; an absorber which is connected to the cooling fluid circuit and the process medium circuit; a condenser which is connected to the cooling fluid circuit and the process medium circuit; and a control device which is configured to individually control a supply of the cooling fluid to the absorber and a supply of the cooling fluid to the condenser during operation of the sorption system.

By means of controlling the supply of the cooling fluid to the absorber and the supply of the cooling fluid to the condenser by the control device, an input temperature of the cooling fluid to the absorber and an input temperature of the cooling fluid to the condenser can be controlled differently, individually or independently of each other.

Furthermore, by means of the control device, the outlet temperature of the cooling fluid from the absorber and of the cooling fluid from the condenser can be controlled differently or individually (separately).

In particular, by means of differently or individually controlling the supply of cooling fluid to the absorber and the supply of cooling fluid to the condenser, the direct dependence of the inlet temperature of one of the two on the inlet and/or the outlet temperature of the other one can be eliminated.

By means of controlling the supply of the cooling fluid to the absorber and the supply of the cooling fluid to the condenser by the control device, a flow ratio for a flow of the cooling fluid through the absorber and a flow of the cooling fluid through the condenser can be controlled. Alternatively or additionally, the absolute magnitude of the flow rate of the cooling fluid through the absorber and the flow rate of the cooling fluid through the condenser can be controlled individually or differently from each other.

In a first state of the control device compared to a basic state of the control device, the supply of the cooling fluid to the absorber can be decreased and/or the supply of the cooling fluid to the condenser can be increased. In particular, the supply of the cooling fluid to the absorber can be decreased compared to the supply of the cooling fluid to the condenser.

It can be provided that in the basic state of the control device, the absorber and the condenser are each supplied with an amount of cooling fluid typical for the operation of a sorption system. The amount of cooling fluid supplied to the absorber and/or the condenser in the basic state of the control device can be 50% of the maximum amount of cooling fluid that can be supplied. Alternatively, the amount of cooling fluid supplied to the absorber and/or condenser can each be a different value between 10% and 100% of the maximum amount that can be recirculated.

In the first state of the control device, a concentration of refrigerant in a portion of a solvent circuit formed in the process medium circuit and containing the solvent can be decreased. By decreasing the supply of cooling fluid to the absorber, the heat transfer value in the absorber can be decreased and/or the temperature of the cooling fluid in the absorber can be increased relative to the basic state.

It can be provided that in the basic state of the control device just as much refrigerant is supplied to the absorber and to the solvent circuit as vapor as is withdrawn from the solvent circuit in the desorber and supplied to the condenser and liquefied there.

The sorption system can comprise a desorber which is connected to the solvent circuit. An expulsion of the refrigerant in the desorber can be reduced by increasing the concentration of refrigerant compared to the basic state of the control device. An expulsion of the refrigerant in the desorber can also be reduced by lowering the equilibrium pressure of the vapor phase in the desorber.

By increasing the supply of the cooling fluid to the condenser, the heat transfer value in the condenser can be increased and/or the temperature of the cooling fluid in the inlet to the condenser can be decreased.

In the first state of the control device, a supply of the refrigerant to the condenser can be increased compared to the basic state of the control device and subsequently, the refrigerant can be stored in a storage device connected to the process medium circuit. In particular, the storage device can be part of the process medium circuit. By means of the storage of the refrigerant, a storage of cold can be implemented in a latent manner in the form of a liquid-to-gas phase change.

In a second state of the control device, the supply of the cooling fluid to the absorber can be increased and/or the supply of the cooling fluid to the condenser can be decreased compared to the basic state of the control device. In particular, the supply of the cooling fluid to the absorber can be increased compared to the supply of the cooling fluid to the condenser.

In the second state of the control device, the refrigerant can be discharged from the storage device.

The sorption system can comprise an evaporator which is connected to the process medium circuit. In the second state of the control device, the refrigerant can be supplied from the storage device to the evaporator and heat from a low temperature heat source can be supplied to the refrigerant via the evaporator.

The storage device can be at least partially arranged in the evaporator. In particular, the storage device can be arranged entirely within the evaporator. The storage device can also be arranged at least partially outside the evaporator.

The cooling fluid in the cooling fluid circuit can be guided via an absorber portion to the absorber and via a condenser portion to the condenser. The condenser portion and/or the absorber portion can be connected to the control device and/or at least partially arranged in the control device. The condenser portion can be arranged at least partially in the condenser. It can be provided that the condenser portion is not connected to the absorber and/or is arranged in the absorber. The absorber portion can be arranged at least partially in the absorber. It can be provided that the absorber portion is not connected to the condenser and/or is arranged therein. The absorber portion can be arranged in series with the capacitor portion. In a serial arrangement, in particular, a cooling fluid which has passed through one portion can pass through the other portion immediately thereafter. The absorber portion can be arranged upstream of the condenser portion in such a manner that the cooling fluid first passes through the absorber portion and subsequently through the condenser portion. Alternatively, the condenser portion can be arranged upstream of the absorber portion. The absorber portion can be arranged parallel to the condenser portion. In this manner, a quantity of cooling fluid coming from the control device can either pass only through the absorber portion or only through the condenser portion.

A supply of cooling fluid to the absorber portion can be controlled by means of at least one first flow-regulating component of the control device. Furthermore, a supply of cooling fluid to the condenser portion can be controlled by means of at least one second flow-regulating component of the control device. The supply of cooling fluid to the absorber portion and to the condenser portion can also be controlled by means of at least one common flow-regulating component of the control device. The flow regulating components can each be actively controllable. The flow regulating components can each comprise a pump, a jet pump, a valve, and/or a flap valve. The valves can comprise a through-way valve, a mixing valve and/or a diverting valve. It can be provided that one or more pumps is/are arranged in the absorber portion and/or in the condenser portion.

It can be provided that the different or individual control of the supply of the cooling fluid to the absorber and the supply of the cooling fluid to the condenser is effected by means of the same flow-regulating component, in particular a valve, of the control device. In addition, a further flow-regulating component of the control device, in particular a pump for regulating a total volume flow of the cooling fluid through the absorber and of the cooling fluid through the condenser, can be provided.

The different or individual control of the supply of the cooling fluid to the absorber and the supply of the cooling fluid to the condenser can also be performed by means of a respective flow-regulating component of the control device.

The valves and/or the pumps of the control device can be automatically controllable. In a further configuration, the valves and/or pumps of the control device are continuously variable in their operating range. Furthermore, the supply of cooling fluid to the absorber and/or condenser unit can be monitored together or separately with respect to the respective inlet temperatures and volume flows. In particular, the values from the monitoring can be used for the control.

Different control of the supply of cooling fluid to the absorber and the supply of cooling fluid to the condenser can mean, for example, that during the process of controlling, the absolute amount of cooling fluid supplied to the absorber and the absolute amount of cooling fluid supplied to the condenser change to different extents, although a relative ratio of the amount of cooling fluid supplied to the condenser and to the absorber (for example, per unit time) can remain the same.

In connection with the arrangement for a sorption system and with the sorption system, the configurations described above in connection with the method for operating a sorption system can be provided accordingly.

DESCRIPTION OF EXEMPLARY EMBODIMENTS

In the following, further exemplary embodiments are explained in more detail with reference to figures of a drawing.

Figure 1:
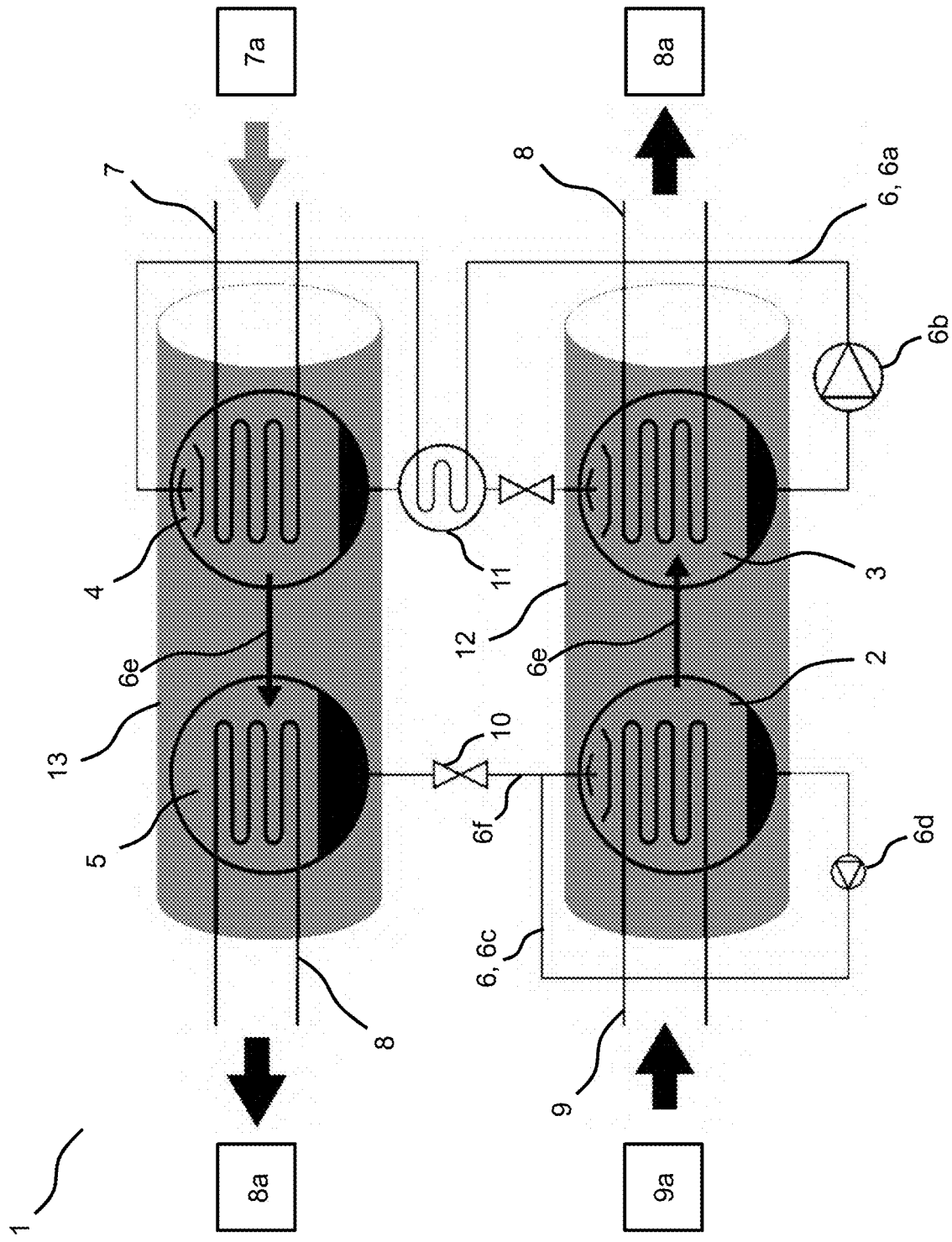
FIG. 1 shows a schematic illustration of a sorption system.

FIG. 1 shows a schematic illustration of a sorption system in the form of an absorption refrigeration system 1 with an evaporator 2, an absorber 3, a desorber 4 and a condenser 5, each of which is connected to a process medium circuit 6.

Refrigerant and solvent are fed through the process medium circuit 6. Furthermore, a solution containing solvent, in which the refrigerant can be dissolved, is fed through a solvent circuit 6a to which the absorber 3 and the desorber 4 are connected. The solvent circuit 6a is operated by means of a pump 6b, and a portion (refrigerant circuit) 6c of the process medium circuit 6, which generally contains no or little solvent, is operated by means of a pump 6d. Refrigerant vapor 6e is fed from the evaporator 2 into the absorber 3 and from the desorber 4 into the condenser 5. Furthermore, liquid refrigerant is fed from the condenser 5 into the evaporator 2 via the portion 6f.

The desorber 4 is connected to a high temperature circuit 7 via which heat is supplied from a high-temperature heat source 7a to expel the refrigerant vapor in desorber 4.

Figure 3:
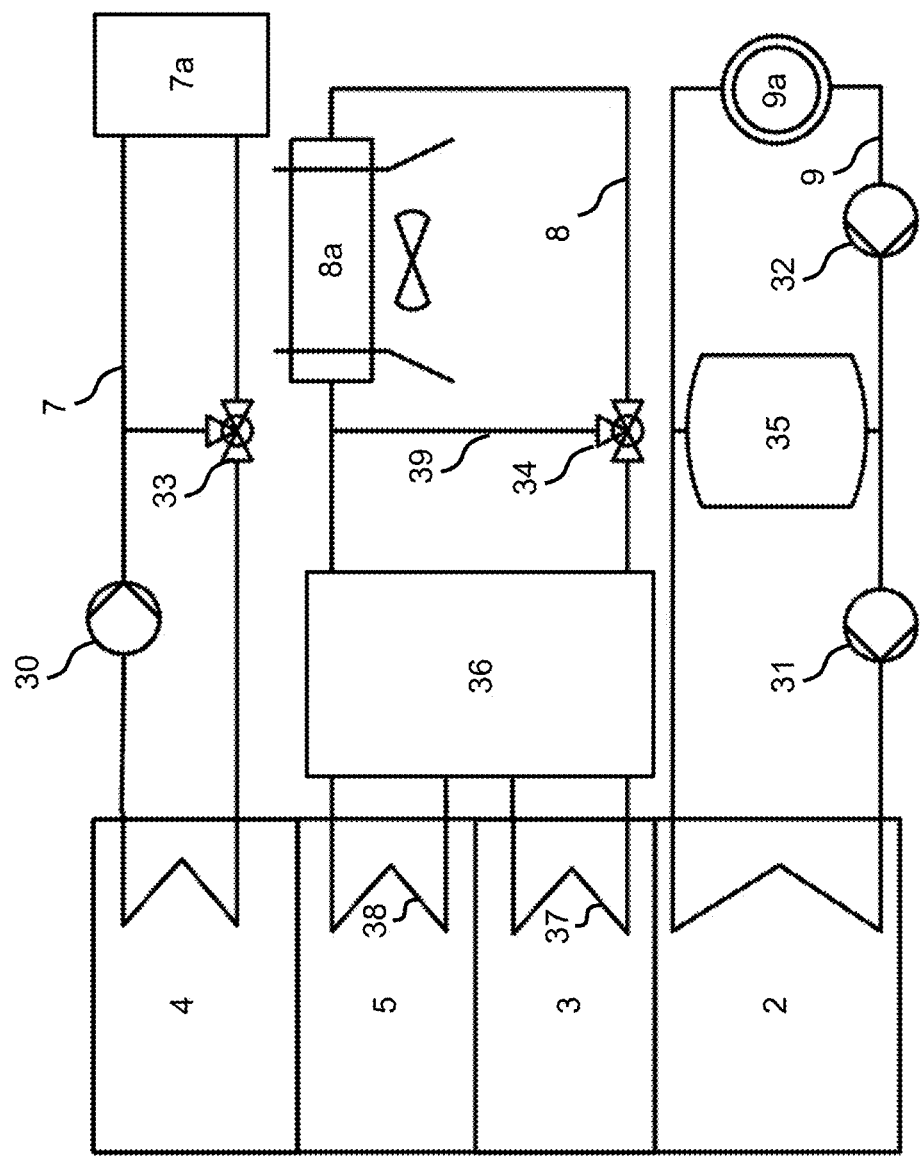
FIG. 3 shows a schematic illustration for controlling a cooling fluid circuit for a sorption system.

A control path is provided (often designed as a combination of a pump and a valve, see also FIG. 3 with pump 30 and valve 33) to control the temperature and/or amount of fluid from the (external) high-temperature heat source 7a supplied to the desorber 4.

The waste heat at the absorber 3 and condenser 5 is discharged via a heat sink circuit/cooling fluid circuit 8 to a heat sink 8a by means of cooling fluid. This is done using a pump, a bypass and a valve (cf. FIG. 4 with pump 44, bypass 39 and valve 34).

The absorption refrigeration system 1 is used to cool a low-temperature heat source 9a by extracting heat from the low-temperature heat source 9a via a low-temperature circuit 9 to which the evaporator 2 is connected.

Furthermore, a throttle 10 is provided in the refrigerant circuit 6c, and a solution heat exchanger 11 is provided in the solution circuit 6a. The evaporator 2 and the absorber 3 are arranged in a common housing 12, and the desorber 4 and the condenser 5 are arranged in a common housing 13. The housings 12, 13 can be cylindrical, for example. Alternatively, the evaporator 2, the absorber 3, the desorber 4 and the condenser 5 are not arranged in separate housings.

Figure 2:
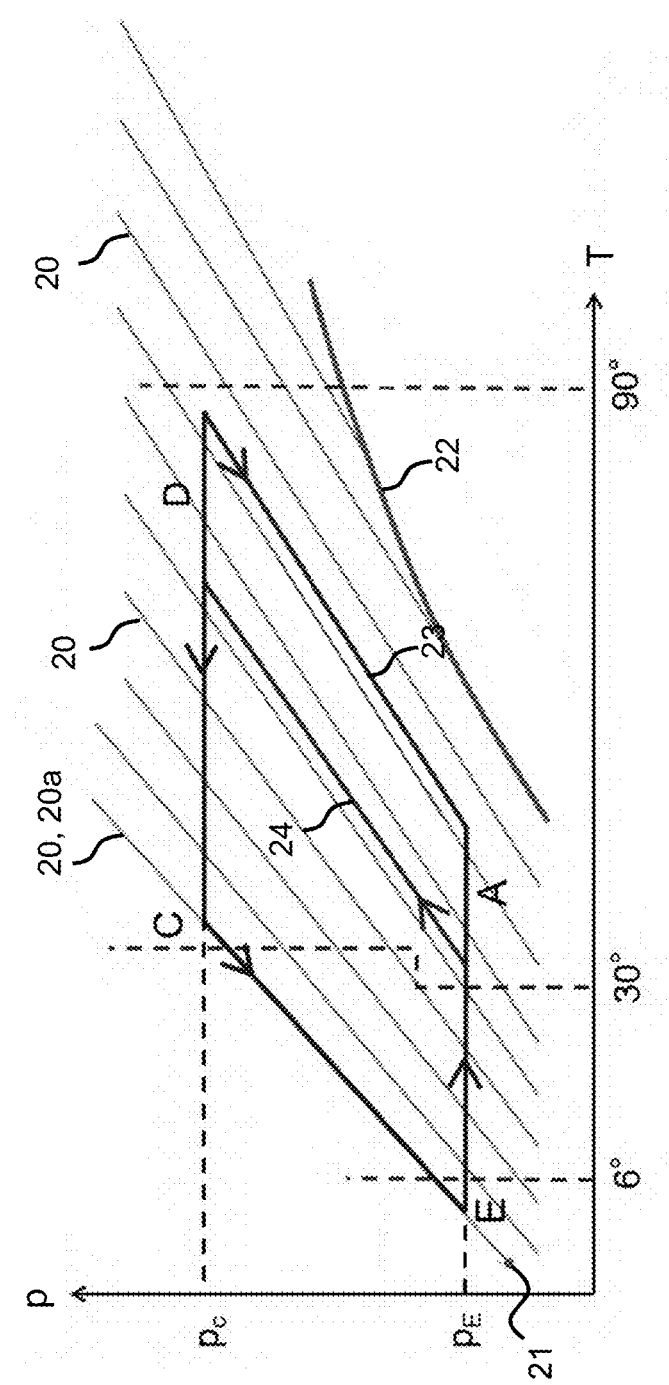
FIG. 2 shows a pressure-temperature diagram for illustrating an absorption refrigeration system process.

FIG. 2 shows a pressure-temperature diagram for schematic illustration of the location of the process and solution field, as well as the refrigerant within an absorption refrigeration system process. The respective process portions at the evaporator 2, the absorber 3, the desorber 4 and the condenser 5 are marked with E, A, D and C, respectively.

In the present example, water acts as the refrigerant and lithium bromide (LiBr) as the solvent. The following details describe a possible operating point. The low-temperature heat source 9a is operated at 6° C., the heat sink 8a at 30° C. and the high-temperature heat sources at 90° C. The absorption refrigeration system is operated with pressures p between an evaporator pressure/evaporator pressure $p_E$ and condenser pressure $p_c$. The lines/isosteres 20 represent areas of equal solvent concentration. The concentration increases with increasing temperature at the same pressure. Isostere 20a corresponds to pure water without LiBr. Point 21 represents the triple point of water. Crystallization occurs to the right of the crystallization line 22 (depending on pressure and temperature). With higher pressures and higher temperatures, this crystallization line shifts to higher concentrations relative to the amount of LiBr in solution, at which crystallization begins. Solution with low water concentration/high LiBr concentration flows from the desorber to the absorber (process level line 23) and solution with higher water concentration flows from the absorber to the desorber (process level line 24).

The position of the corner points of the process and the position of the solution field are determined by the heat transfer values (UA values) of the heat exchangers (in evaporator 2, absorber 3, desorber 4 and condenser 5) and the respective external temperatures. For each of the heat exchangers it applies that the temporal change of the transferred heat quantity is proportional to the heat transfer coefficient U, the area A of the heat exchanger and the logarithmic temperature difference $\Delta T_{log}$:

$$\dot{Q} = U \cdot A \cdot \Delta T_{log}.$$

Here, the four heat exchangers and the heat transfer taking place there are in constant dependence on each other. The distance of the process temperatures to the temperatures of the heat sources 7a, 9a and the heat sink 8a results from the respective heat transfer values U·A and is essentially determined only by the operation and the specified volume flows of the external fluids (fluids in the heat sink, high-temperature or low-temperature circuit).

The UA values and their ratios between absorber, desorber, condenser and evaporator of different absorption refrigeration systems are different, and the UA values of one type of system can also vary slightly depending on the application, and even within one installation in different operating phases due to external conditions. For example, different temperatures of the heat sink 8a, as they occur in absorption refrigeration systems due to operation at different ambient temperatures, affect the material values of the cooling brine and thus influence (within certain limits) the UA value. The same applies to changes in the high- and low-temperature cycles. The process level, temperatures and concentrations also have an effect on the material values of the process liquids and thus on the respective process-side heat transfer value, which in turn has an influence on the U-value. The same also applies if the volume flows of the external fluids differ between two operating points. Here, in prior art system installations, the volume flows of absorber 3 and condenser 5 cannot be controlled separately and, moreover, their inlet and/or outlet temperatures are directly linked. Even if the volume flows and/or temperatures are not the same, they are not separately adjustable according to the prior art.

FIG. 3 shows a schematic illustration for controlling the cooling fluid circuit 8 for the sorption system 1 with evaporator 2, absorber, desorber 4 and condenser 5. A pump 30 is provided here for operating the high-temperature circuit 7 and pumps 31, 32 are provided here for operating the low-temperature circuit 9. Furthermore, valves 33, 34 can be provided to control volume flows and/or inlet temperatures into the sorption system 1. A storage tank 35 can be provided in the low-temperature circuit 9, which is designed, for example, as a pendulum storage tank. Furthermore, different volume flows can be decoupled via the sorption system 1 and the user circuit by means of the storage tank 35, and the storage tank 35 can be charged or discharged through them.

A control device 36 is arranged in the cooling fluid circuit 8, preferably between in an absorber portion 37 of the cooling fluid circuit 8 at the absorber 3 or a condenser portion 38 of the cooling fluid circuit 8 at the condenser 5 on one side and the heat sink 8*a* on the other side. The control device 36 can comprise at least one pump. Additionally or alternatively, a pump can also be arranged in the cooling fluid circuit outside the control device 36 (not shown). By means of the control device, the cooling fluid flows to the absorber 3 of the cooling fluid circuit and to the condenser 5 can be individually controlled, in particular decoupled and/or actively controlled independently of each other and/or with respect to each other.

The control device 36 in the cooling fluid circuit 8 is arranged parallel to a bypass portion 39. The ratio of the supply of cooling fluid to the heat sink 8*a* and the supply of cooling fluid to the bypass portion 39 is controlled by means of the valve 34. In this way, the supply of cooling fluid to the control device 36 can be regulated. Alternatively, it is also possible to provide no corresponding bypass portion 39 in the cooling fluid circuit 8 (cf. FIG. 6). The bypass portion 39 can also be arranged within the control device 36.

Figure 4:
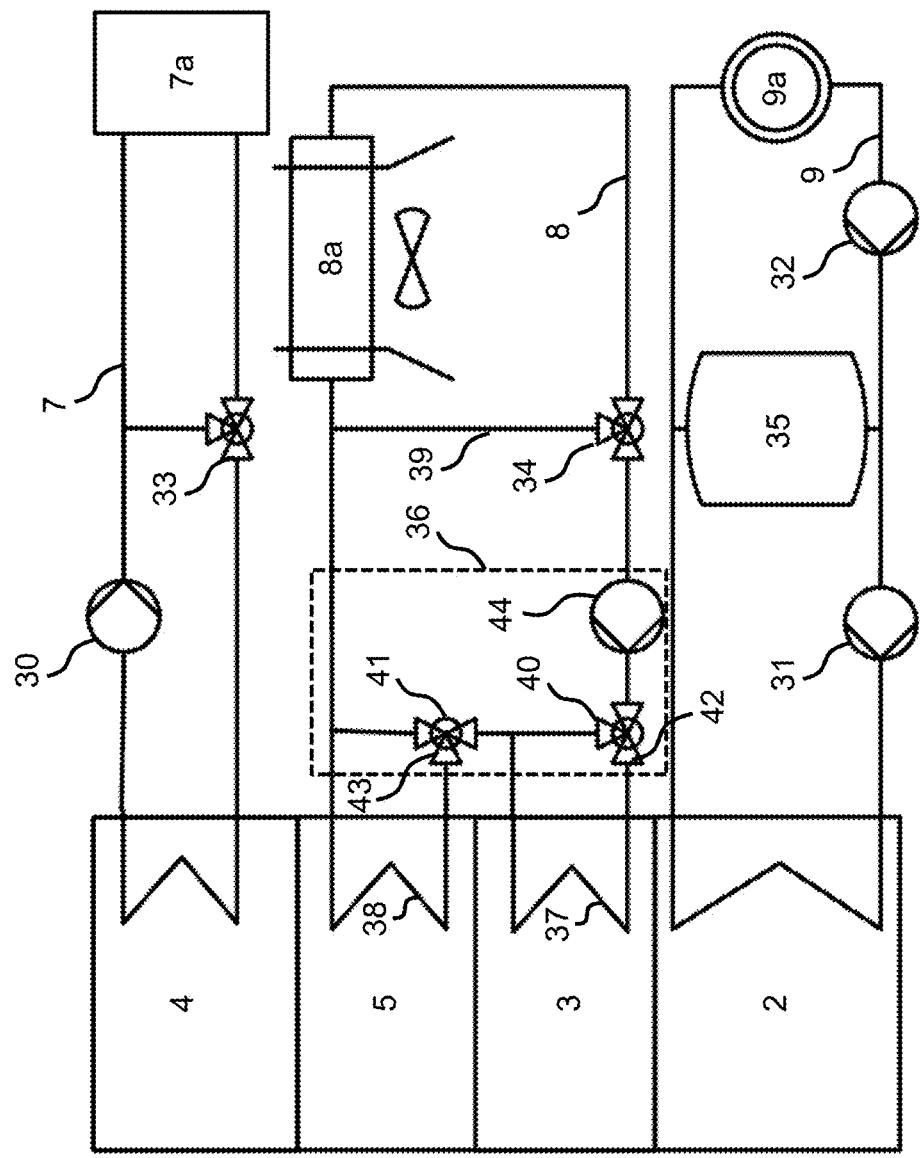
FIG. 4 shows a schematic illustration of an embodiment of a control device.

FIG. 4 shows a schematic illustration of an embodiment of the control device 36. A flow of completely or partially the same cooling fluid successively flows through the absorber 3 and the condenser 5 (serial arrangement with possible parallel portion). Two controllable valves 40, 41 are provided, which make it possible to change the absorber 3 and the condenser 5 independently of each other during operation with regard to the flow of cooling fluid through them and thus independently of each other with regard to the UA values of the absorber 3 and the condenser 5. In this manner, in a first state of the control device 36, with a fully or partially active bypass around the absorber 3 (so that reduced or no cooling fluid flows to the absorber in the absorber portion 37), the solution field is shifted to higher concentrations of solvent.

The refrigerant expelled with respect to a reference state with closed bypass is collected, for example, in an area of the evaporator 2. Additionally or alternatively, the refrigerant is collected in the condenser or a third location. The released refrigerant is not used in the first state of the control device 36, and thus effectively represents a quantity of cold stored in the absorption refrigeration system 1.

The stored quantity of cold can be retrieved in a second state of the control device 36 by means of a relative increase of the supply of refrigerant fluid to the absorber compared to the supply to the condenser (compared to the process of storing the refrigerant in the first state of the control device 36 or compared to the basic state of the control device 36) and used in the evaporator 2 for refrigeration, up to a fully or partially active bypass around the condenser 5 and the condenser portion 38. Here, in the case of a LiBr absorption refrigeration system, the amount of energy stored per unit volume of water (refrigerant) corresponds to about ten times of that of an ice storage tank and to about one hundred times of that of a conventional sensible cold water storage tank.

In addition, from the reference state, by increasing the supply of cooling fluid to the absorber 3 with respect to the supply to the condenser 5, a quantity of refrigerant already present in the storage device or process medium circuit 6 can also be used to provide additional refrigeration (with respect to the reference state), which quantity can be refilled again at another time.

It is possible to use only one effectively controllable bypass, preferably around the absorber 3 and the absorber portion 37 to control the ratio of supply of cooling fluid or flow of cooling fluid between absorber 3 and condenser 5. For this purpose, (for increasing the amount of refrigerant in the refrigerant circulation 6*c*) the valve 40 is controlled in such a manner that a valve outlet 42 is further opened for discharging. Alternatively, it is also possible to provide only one effective bypass around the condenser 5 and the condenser portion 38. For this purpose, the valve 41 is controlled in such a manner that a valve outlet 43 is opened further for charging.

Preferably, cooling fluid flows first through the absorber 3 and then through the condenser 5. Alternatively, it is also possible for the flow to flow first through the condenser 5 and then through the absorber 3. The direction and quantity of the flow of cooling fluid can be controlled by means of a pump 44.

Figure 5:
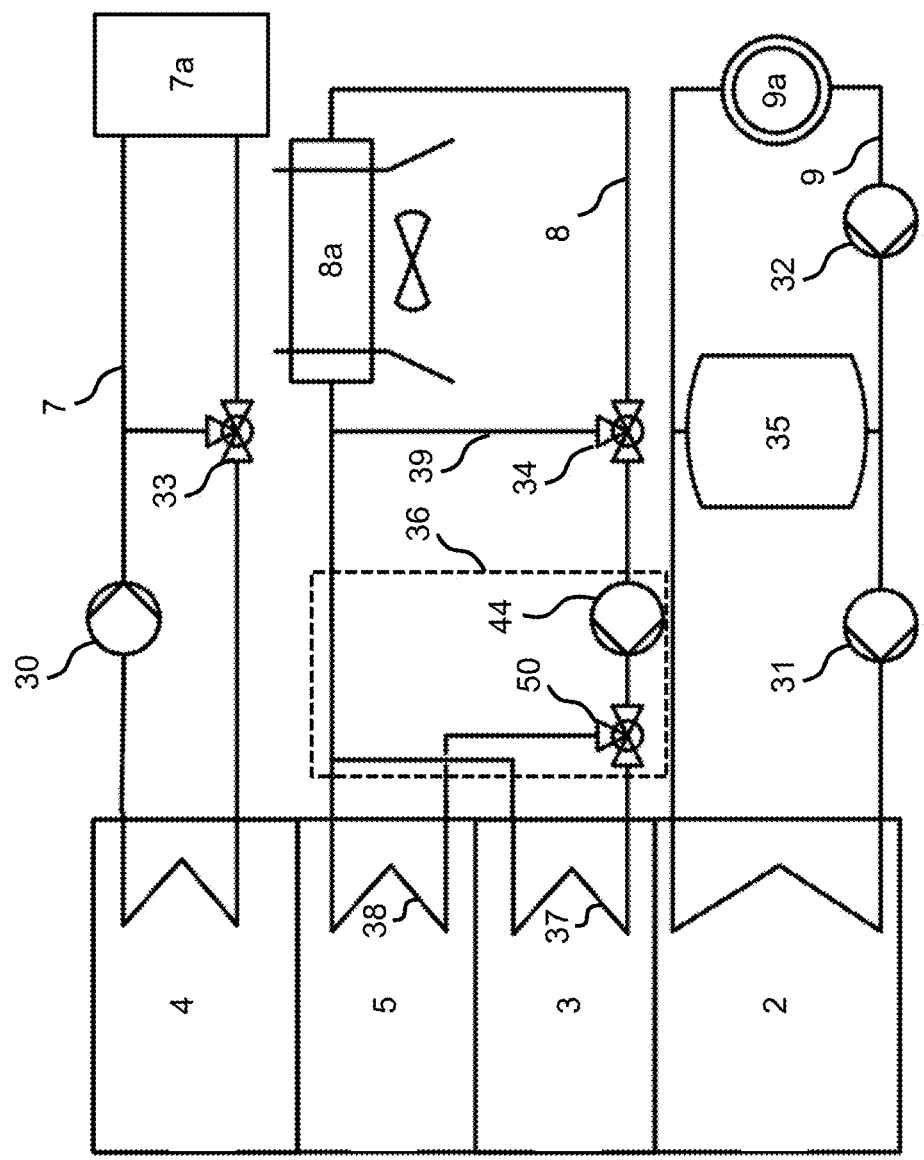
FIG. 5 shows a schematic illustration of a further embodiment of a control device.

FIG. 5 shows a schematic illustration of a further embodiment of the control device 36. Only one actively controllable valve 50 is provided, which controls the ratio of cooling fluid flowing through between the absorber portion 37 and the condenser portion 38. The absorber portion 37 and the condenser portion 38 are in a parallel flow arrangement. Here, the inlet temperatures are identical. The volume flows through absorber 3 and condenser 5 can be varied in opposite directions by the valve position of valve 50 and the total volume can be controlled by pump 44.

Figure 6:
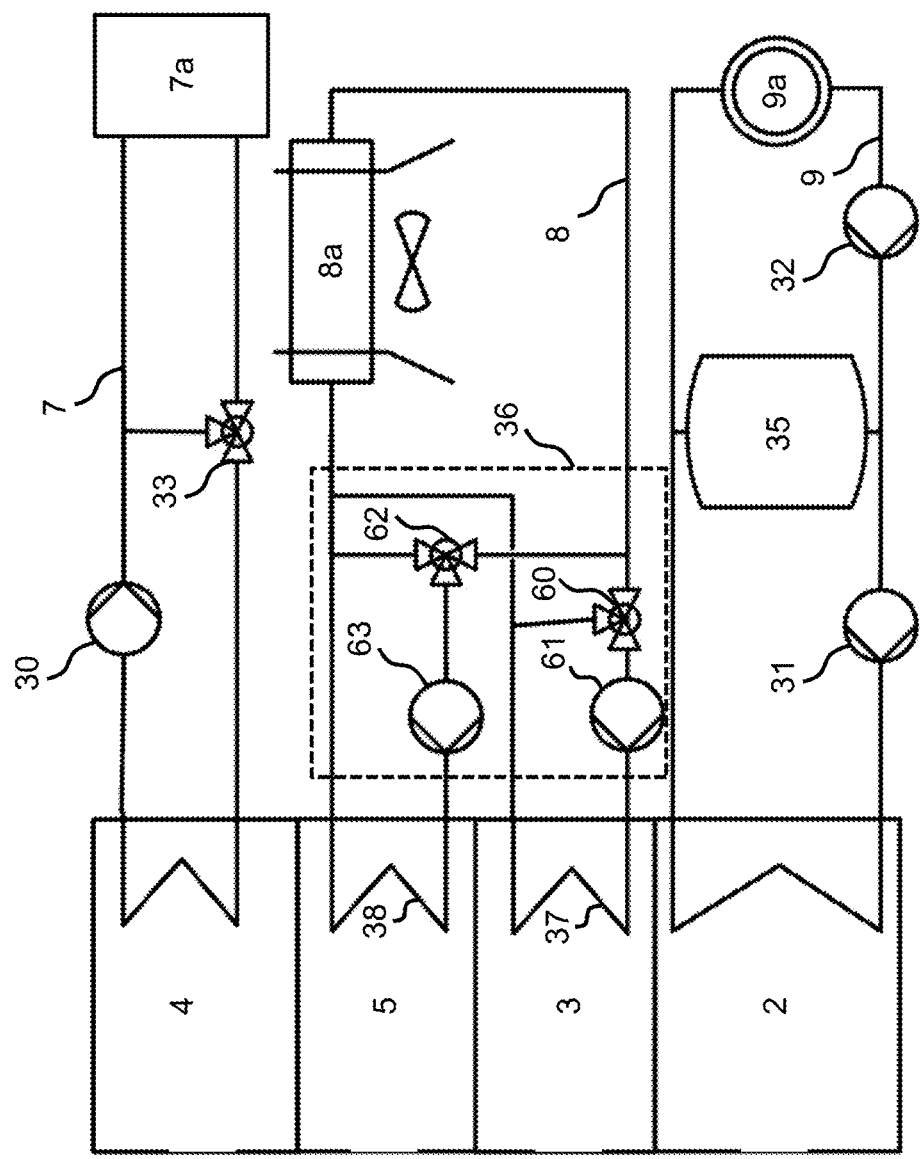
FIG. 6 shows a schematic illustration of a further embodiment of a control device.

FIG. 6 shows a schematic illustration of a further embodiment of the control device 36. As in the embodiment according to FIG. 5, cooling fluid flows through the absorber portion 37 and the condenser portion 38 in parallel. The cooling fluid flow through the absorber portion 37 is controlled by the valve 60 and the pump 61, while the cooling fluid flow through the condenser portion 38 is controlled by the valve 62 and the pump 63. In this manner, it is possible to not only control the cooling fluid flows separately from each other, but also to decouple the inlet temperatures to the absorber 3 or the condenser 5 from each other. Hereby, the process of storing refrigerant in the storage device and the process of retrieving refrigerant from the storage device can be initiated more quickly.

Furthermore, the speed of storing or retrieving refrigerant can be increased. In addition, operating field limits due to crystallization of the solvent or possible icing of the refrigerant can be more easily maintained during operation due to the freedom of being able to control temperatures and flow rates of the refrigerant fluid through absorber 3 and condenser 5 completely independently. At the same time, due to the decoupling, the safety routines required to prevent crystallization or ice formation in the absorption refrigeration system have more options available to respond to such events.

The storage capability depends on the amount of operating medium (solvent and refrigerant) in the sorption system. The magnitude of cold storage also depends on the charging and discharging concentration of the solution and the particular load case for the sorption system. In addition to manufacturer-dependent safety limits, the charging concentration is physically limited by crystallization (see FIG. 4). The discharge concentration depends on the design and operating point.

Using the example of three system types A1, A2 and A3 equipped with the method and having nominal capacities of 50 W, 160 W and 500 kW, respectively, Table 1 compares the storage capacity with the size of corresponding sensible cold water storage tanks (Table 1, last line). A typical solution concentration difference in $kg_{LiBr}/kg_{solution}$ of 10% between charging and discharging is assumed. This shows that with the appropriate configuration and use of the method, a storage equivalent of 5 m³ is possible when using system A1.

TABLE 1

|  | Unit | A1 | A2 | A3 |
|---|---|---|---|---|
| Solution (54% LiBr in solution) | [L] | 55 | 110 | 240 |
| Refrigerant/water | [L] | 26 | 35 | 200 |
| Mass of solution | [kg] | 92 | 185 | 403 |
| Mass of solvent/LiBr | [kg] | 50 | 100 | 218 |
| Mass of water | [kg] | 68 | 120 | 385 |
| Solution charged (63% LiBr in solution) | [kg] | 79 | 158 | 346 |
| Solution discharged (53% LiBr in solution) | [kg] | 127 | 226 | 727 |
| Difference ($m_{H2O}$) | [kg] | 48 | 68 | 382 |
| Energy storage capacity | [kWh] | 30 | 43 | 239 |
| Cold water storage equivalent | [m³] | 5.2 | 7.3 | 41.1 |

The exploitable storage capacity increases linearly with the quantity of process media. In this respect, a corresponding increase in the quantities of process media enables much higher cold water storage equivalents for the same systems.

The features disclosed in the above description, the claims and the drawing can be of importance for the implementation of the various embodiments, both individually and in any combination.

REFERENCE LIST 1 absorption refrigeration system
2 evaporator
3 absorber
4 desorber
5 condenser
6 process medium circuit
6a solvent circuit
6b pump
6c portion of the process medium circuit 6 (refrigerant circulation)
6d pump
6e refrigerant vapor
6f portion
7 high-temperature circuit
7a high-temperature heat source
8 heat sink circuit/cooling fluid circuit
8a heat sink
9 low-temperature circuit
9a low-temperature heat source
10 throttle
11 solution heat exchanger
12, 13 housing
20, 20a lines of equal concentration
21 point (triple point of water)
22 crystallization line
23, 24 process level lines
30-32 pumps
33, 34 valves
35 storage tank
36 control device
37 absorber portion
38 condenser portion
39 bypass portion
40, 41 valves
42, 43 valve outlets
44 pump
50 valve
60 valve
61 pump
62 valve
63 pump

The invention claimed is:

1. A method for operating a sorption system, the sorption system comprising the following:
a cooling fluid circuit with a cooling fluid;
a process medium circuit with a refrigerant and a solvent;
an absorber which is connected to the cooling fluid circuit and to the process medium circuit;
a condenser which is connected to the cooling fluid circuit and to the process fluid circuit; and
a control device;
wherein during operation of the sorption system, the cooling fluid is supplied to the absorber and to the condenser, wherein a supply of the cooling fluid to the absorber and a supply of the cooling fluid to the condenser are controlled differently from each other by means of the control device and a flow ratio for a flow of the cooling fluid through the absorber and a flow of the cooling fluid through the condenser is controlled, wherein the supply of the cooling fluid to the absorber and the supply of the cooling fluid to the condenser are controlled independently.

2. The method according to claim 1, characterized in that by means of controlling the supply of the cooling fluid to the absorber and the supply of the cooling fluid to the condenser by the control device, an input temperature of the cooling fluid to the absorber and an input temperature of the cooling fluid to the condenser are controlled differently.

3. The method according to claim 1, characterized in that in a first state of the control device compared to a basic state of the control device,
the supply of the cooling fluid to the absorber is decreased and/or
the supply of the cooling fluid to the condenser is increased.

4. The method according to claim 3, characterized in that in the first state of the control device compared to the basic state of the control device, a concentration of refrigerant in a portion of a solvent circuit formed in the process medium circuit and containing the solvent is decreased.

5. The method according to claim 4, characterized by a desorber which is connected to the solvent circuit, wherein the control device is configured to increase the concentration of refrigerant as compared to the basic state of the control device.

6. The method according to claim 3, characterized in that, when the supply of the cooling fluid to the condenser is increased in the first state of the control device, subsequently the refrigerant is stored in a storage device which is connected to the process medium circuit.

7. The method according to claim 3, characterized in that in a second state of the control device compared to the basic state of the control device,
   the supply of the cooling fluid to the absorber is increased and/or
   the supply of the cooling fluid to the condenser is decreased.

8. The method according to claim 7, characterized in that in the second state of the control device, the refrigerant is discharged from the storage device.

9. The method of claim 8, characterized by an evaporator which is connected to the process medium circuit, wherein in the second state of the control device, the refrigerant is supplied from the storage device to the evaporator and heat from a low-temperature heat source is dissipated to the refrigerant via the evaporator.

10. The method according to claim 9, characterized in that the storage device is at least partially arranged in the evaporator.

11. The method according to claim 1, characterized in that the cooling fluid in the cooling fluid circuit is supplied via an absorber portion to the absorber and via a condenser portion to the condenser.

12. The method according to claim 11, characterized in that
   a supply of cooling fluid to the absorber portion is controlled by means of at least one first flow-regulating component of the control device and/or
   a supply of cooling fluid to the condenser portion is controlled by means of at least one second flow-regulating component of the control device.

13. An arrangement for a sorption system, comprising:
   a cooling fluid circuit with a cooling fluid;
   a process medium circuit with a refrigerant and a solvent;
   an absorber which is connected to the cooling fluid circuit and to the process medium circuit;
   a condenser which is connected to the cooling fluid circuit and to the process medium circuit; and
   a control device which is configured to, during operation of the sorption system, control the supply of the cooling fluid to the absorber and the supply of the cooling fluid to the condenser differently from each other and to control a flow ratio for a flow of the cooling fluid through the absorber and a flow of the cooling fluid through the condenser, wherein the control device is configured to independently control the supply of cooling fluid to the absorber and the supply of cooling fluid to the condenser.

* * * * *